United States Patent
Zhang et al.

(10) Patent No.: US 12,421,575 B2
(45) Date of Patent: Sep. 23, 2025

(54) NICKEL-BASED SUPERALLOY AND PREPARATION METHOD THEREFOR, AND STRUCTURAL COMPONENT

(71) Applicant: GAONA AERO MATERIAL CO., LTD, Beijing (CN)

(72) Inventors: Shaoming Zhang, Beijing (CN); Zhongnan Bi, Beijing (CN); Ming Zhang, Beijing (CN); Jiantao Liu, Beijing (CN); Mingdong Liu, Beijing (CN)

(73) Assignee: GAONA AERO MATERIAL CO., LTD., Beijing (CN)

( * ) Notice: Subject to any disclaimer, the term of this patent is extended or adjusted under 35 U.S.C. 154(b) by 0 days.

(21) Appl. No.: 18/575,622

(22) PCT Filed: Aug. 11, 2023

(86) PCT No.: PCT/CN2023/112658
§ 371 (c)(1),
(2) Date: Dec. 29, 2023

(87) PCT Pub. No.: WO2024/139240
PCT Pub. Date: Jul. 4, 2024

(65) Prior Publication Data
US 2024/0336998 A1    Oct. 10, 2024

(30) Foreign Application Priority Data
Dec. 29, 2022  (CN) .......................... 202211701504.7

(51) Int. Cl.
| | |
|---|---|
| *C22C 19/05* | (2006.01) |
| *B22F 3/15* | (2006.01) |
| *B22F 3/20* | (2006.01) |
| *B22F 9/08* | (2006.01) |
| *C22C 1/02* | (2006.01) |

(52) U.S. Cl.
CPC .............. *C22C 19/056* (2013.01); *B22F 3/15* (2013.01); *B22F 3/20* (2013.01); *B22F 9/082* (2013.01); *C22C 1/023* (2013.01); *C22C 19/057* (2013.01); *B22F 2003/208* (2013.01)

(58) Field of Classification Search
CPC ....... C22F 1/10; C22C 19/057; C22C 19/056; C22C 1/0433
See application file for complete search history.

(56) References Cited

U.S. PATENT DOCUMENTS

| | | |
|---|---|---|
| 6,521,175 B1 | 2/2003 | Mourer et al. |
| 2011/0203707 A1 | 8/2011 | Mourer et al. |
| 2013/0209265 A1 | 8/2013 | Reynolds et al. |

FOREIGN PATENT DOCUMENTS

| | | | |
|---|---|---|---|
| CN | 101935780 A | 1/2011 | |
| CN | 103717767 A | 4/2014 | |
| CN | 104946933 A | 3/2018 | |
| CN | 105492639 A | 5/2018 | |
| CN | 108425037 A | 8/2018 | |
| CN | 110241331 A | 10/2020 | |
| CN | 113186431 A | 7/2021 | |
| CN | 111187946 A | 11/2021 | |
| CN | 110205523 A | 8/2022 | |
| CN | 115679157 A | 2/2023 | |
| CN | 111629852 A | 3/2023 | |
| EP | 1195446 A1 | 4/2002 | |
| GB | 2587635 A * | 4/2021 | ............. B33Y 70/00 |
| WO | WO 2012/047352 A2 | 4/2012 | |
| WO | WO 2016/152985 A1 | 9/2016 | |
| WO | WO 2020/195049 A1 | 10/2020 | |

OTHER PUBLICATIONS

Choudhury, I. A., and M. A. El-Baradie. "Machinability of nickel-base super alloys: a general review." Journal of Materials Processing Technology 77.1-3 (1998): 278-284.*
International Search Report dated Sep. 21, 2023 in application No. PCT/CN2023/112658.
Office Action issued in corresponding China Application No. 2022117015047 dated Feb. 7, 2023.
Notice of Grant of Invention Patent Right issued in corresponding China application No. 202211701504.7 dated Feb. 27, 2023.
Written Opinion dated Sep. 21, 2023 in application No. PCT/CN2023/112658.

* cited by examiner

*Primary Examiner* — Jessee R Roe
(74) *Attorney, Agent, or Firm* — Knobbe, Martens, Olson & Bear, LLP

(57) ABSTRACT

The present disclosure relates to the technical field of nickel-based superalloys, and in particular to a nickel-based superalloy and preparation method therefor, and a structural component. The alloy includes the following components in mass percentage: Co 17%-22%, Cr 9%-13%, Ta 2.95%-3.95%, Al 2.5%-3.5%, Ti 2.5%-3.5%, W 2.1%-3.5%, Mo 2.1%-3.5%, Nb 1.65%-1.95%, Hf 0.2%-0.7%, C 0.03%-0.08%, B 0.01%-0.06%, Zr 0.03%-0.07% and Ni. The nickel-based superalloys of the present disclosure, in the creep process at 780° C., produces specific Suzuki atmosphere in certain positions, and locks dislocations to improve creep resistance, such that the operating temperature can be raised to more than 780° C., which meets the requirements on the materials for the advanced aero-engines.

8 Claims, 3 Drawing Sheets

NICKEL-BASED SUPERALLOY AND PREPARATION METHOD THEREFOR, AND STRUCTURAL COMPONENT

CROSS-REFERENCES TO RELATED APPLICATIONS

The present application is a U.S. national phase application under 35 U.S.C. 371 of International Application No. PCT/CN2023/112658, filed Aug. 11, 2023, which claims the benefit of priority to Chinese patent application No. 202211701504.7, filed with the Chinese Patent Office on Dec. 29, 2022, entitled "Nickel-based Superalloy and Preparation Method Therefor, and Structural Component", the entire contents of which are incorporated herein by reference.

TECHNICAL FIELD

The present disclosure relates to the technical field of nickel-based superalloys, and in particular to a nickel-based superalloy and preparation method therefor, and a structural component.

BACKGROUND ART

Superalloys are widely used in the core hot-end components of aviation and aerospace engines, ships and industrial gas turbines because of their outstanding performance in high-temperature operating environments, and the used amount in modern aviation engines accounts for 40%-60% of the engine mass.

The temperature before turbine is an important indicator of engine sophistication, which refers to the temperature of the high-temperature and high-pressure gas stream after combustion before entering the turbine. The higher the value of this temperature is, the higher the internal energy of the gas in front of the turbine is, the higher the work that can be done is when the same flow of gas passes through the turbine, and the better the performance of the engine is. Increasing the temperature before turbine is an important technical means of increasing engine thrust, but places severe demands on material properties. Under high-temperature and high-stress state, dislocation movement in the alloy becomes easy, which causes the alloy to deform, crack and other forms of failure. Superalloys of related technologies do not have sufficient service temperatures to meet the requirements of advanced aviation engines on the materials (above 780° C.).

In view of the above, the present disclosure is proposed.

SUMMARY

The present disclosure provides a nickel-based superalloy, which at least solves the technical problem that operating temperature of existing alloy in the related technology cannot meet the requirements of advanced aviation engines.

The present disclosure also provides preparation method for nickel-based superalloys.

The present disclosure further provides structural components prepared using nickel-based superalloys.

Embodiments of the present disclosure provide a nickel-based superalloy that can include the following components by mass percentage:
Co 17%-22%, Cr 9%-13%, Ta 2.95%-3.95%, Al 2.5%-3.5%, Ti 2.5%-3.5%, W 2.1%-3.5%, Mo 2.1%-3.5%, Nb 1.65%-1.95%, Hf 0.2%-0.7%, C 0.03%-0.08%, B 0.01%-0.06%, Zr 0.03%-0.07%, and the balance of Ni, wherein
the sum of the mass percentage of Nb and W is 3.75%-5.2%.

In optional embodiments of the present disclosure, the sum of the mass percentage of Nb and W in the nickel-based superalloys can be 4.1%-5.1%.

In optional embodiments of the present disclosure, the sum of the mass percentage of Ti, Nb and Ta in the nickel-based superalloys can be 7.8%-9.3%.

In optional embodiments of the present disclosure, the mass percentage of Ti, Al, Nb and Ta in the nickel-based superalloys can satisfy: $(Ti+Al)/(Nb+Ta)=1.1-1.3$.

In optional embodiments of the present disclosure, the mass percentage of Cr, Co and Ni in the nickel-based superalloys can satisfy: $Cr/(Co+Ni)=0.14-0.18$.

In optional embodiments of the present disclosure, the nickel-based superalloys can further comprise Mg and/or Ce. Further, the content of Mg can satisfy: $>0$ and $\leq 0.01\%$; and the content of Ce can satisfy: $>0$ and $\leq 0.01\%$.

In optional embodiments of the present disclosure, the nickel-based superalloys, during creep process at 780° C., can have Suzuki atmosphere containing Cr and Co at microtwinning introduced by the creep deformation, and can have Suzuki atmosphere containing Ta, Nb, W and Ti at the superlattice stacking fault introduced by the creep deformation.

Embodiments of the present disclosure further provide a preparation method for any of the above-described nickel-based superalloys, which can comprise the following steps:
preparing the bar stock by vacuum induction melting; then processing the bar stock by vacuum induction gas atomization to obtain an alloy powder; and
preparing a billet by treating the alloy powder by hot isostatic pressing; and processing the billet by hot extrusion, forging and heat treatment.

In optional embodiments of the present disclosure, the condition of hot isostatic pressing treatment can comprise: the temperature of hot isostatic pressing treatment is 1120-1130° C., the pressure is 140-150 MPa, and the duration is 4-10 h.

In optional embodiments of the present disclosure, the temperature of hot extrusion can be 1120-1130° C., the extrusion ratio is (5.5-6.5):1, and the extrusion rate is 18-22 mm/s.

In an optional embodiment of the present disclosure, the forging can be isothermal forging, wherein the isothermal forging is at a temperature of 1120-1130° C.; and the press-down rate is 0.8-1.2 mm/s.

Embodiments of the present disclosure also provide a structural component that is primarily made of any of the above-described nickel-based superalloys.

In optional embodiments of the present disclosure, the structural component can comprise a turbine disc.

Compared to the related art, beneficial effects of the present disclosure at least include the following.

(1) The nickel-based superalloys of the present disclosure utilize Nb, W, Ti, and Ta to synergistically strengthen the γ' phase, thereby generating element-specific Suzuki atmosphere at microtwinning and superlattice stacking faults, and pinning the dislocations to improve creep resistance; and (2) the operating temperature of nickel-based superalloys of the present disclosure can be raised to 780-830° C., which meets the requirements of advanced aviation engines on materials.

BRIEF DESCRIPTION OF DRAWINGS

In order to more clearly illustrate the technical solutions in the specific embodiments of the present disclosure or related technologies, the following will briefly introduce the drawings that need to be used in the description of the specific embodiments or related technologies. It is obvious that the drawings in the following description are some embodiments of the present disclosure, and for the person of ordinary skill in the field, other drawings can be obtained based on these drawings, under the premise of not exerting inventive effort.

DETAILED DESCRIPTION OF EMBODIMENTS

Figure 1:
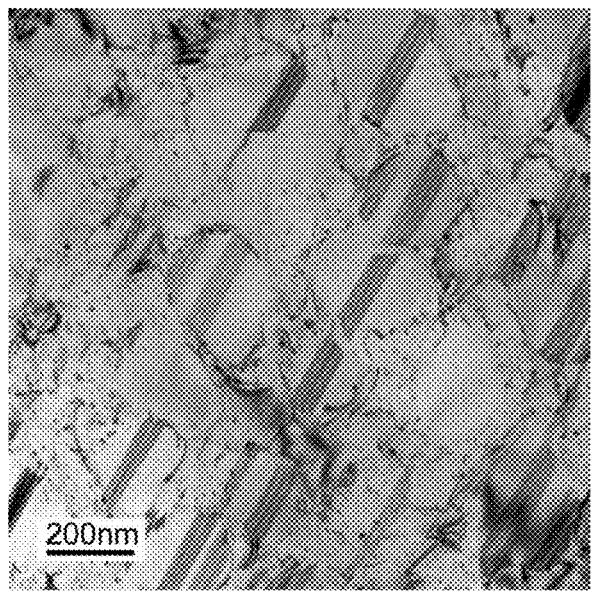
FIG. 1 is a photograph of the structure of a nickel-based superalloy 1# after stress rupture provided in Example 1 of the present disclosure.

The technical solutions of the present disclosure will be clearly and completely described below in conjunction with the drawings and specific embodiments. However, those of skill in the art will understand that the embodiments described below are part of the embodiments of the present disclosure, rather than all embodiments. They are only used to illustrate the present disclosure and should not be considered to limit the scope of the present disclosure. Based on the embodiments in the present disclosure, all other embodiments obtained by a person of ordinary skill in the art without making inventive effort fall within the scope of protection of the present disclosure. If the specific conditions are not specified in the examples, the examples should be carried out according to the conventional conditions or the conditions recommended by the manufacturer. The reagents or instruments used without indication of the manufacturer are conventional products that can be purchased commercially.

The nickel-based superalloys provided by embodiments of the present disclosure can include the following components by mass percentage:

Co 17%-22%, Cr 9%-13%, Ta 2.95%-3.95%, Al 2.5%-3.5%, Ti 2.5%-3.5%, W 2.1%-3.5%, Mo 2.1%-3.5%, Nb 1.65%-1.95%, Hf 0.2%-0.7%, C 0.03%-0.08%, B 0.01%-0.06%, Zr 0.03%-0.07%, and Ni as the balance, wherein the sum of the mass percentage of Nb and W is 3.75%-5.25%.

Since micro-twinning and dislocation climb are the main mechanisms in the creep process of superalloys, the suppression of twinning or dragging dislocations is an essential mechanism of the present disclosure. The nickel-based superalloys of the present disclosure have excellent creep resistance, such that the operating temperature can be elevated above 780° C. Nb, W, Ti, and Ta can synergistically strengthen the $\gamma'$ phase, and the main strengthen method is utilizing specific Nb, W, Ti, Ta, Cr and Co to generate element-specific Suzuki atmosphere at microtwinning and superlattice stacking faults, thereby pinning the dislocations to improve creep resistance.

Due to the high diffusion coefficient of W, the segregation formed at stacking faults is very stable under high temperature, and Nb can promote the segregation of W at hexagonal stacking faults. The sum of mass percentage of Nb and W is regulated to be 3.75%-5.25%, so as to ensure the stability of Suzuki segregation at the superlattice stacking faults.

In addition, the sum of the mass percentage of Ti, Nb and Ta is controlled to be 7.8%-9.3%, so as to ensure that the Al and Ti sublattices in the $\gamma'$ phase can be replaced by Ta and Nb.

In the composition range of the nickel-based superalloy provided by the present disclosure, the alloy obtained will generate Suzuki atmosphere where different elements are segregated at different positions. In the creep process above 780° C., stable Suzuki atmosphere being rich in Cr and Co can be obtained at the microtwinning, and stable Suzuki atmosphere being rich in Ta, Nb, W and Ti can be obtained at stacking faults of superlattices. The strengthening method that uses the Suzuki effect to lock dislocation requires the alloy composition to be within the above range of content. If the sum of the mass percentage of Nb and W exceeds the limited range, it will result in precipitation of a massive $\mu$ phase from the matrix, whereas when the sum of the mass percentages of Nb and W is below the limited range, the W will not be effectively dragged into the stacking faults. When the sum of the mass percentages of Ti, Nb and Ta is below a limited range, there is no stable Suzuki effect formed during creep above 780° C., whereas when the sum of the mass percentages of Ti, Nb and Ta is above a limited range, a massive $\eta$ phase precipitates from the matrix.

For example, in different embodiments, in the nickel-based superalloy, the content of each element in terms of mass percentage can be as follows.

The content of Co can be 17%, 17.5%, 18%, 18.5%, 19%, 19.5%, 20%, 20.5%, 21%, 21.5%, 22%, and so on.

The content of Cr can be 9%, 9.5%, 10%, 10.5%, 11%, 11.5%, 12%, 12.5%, 13%, etc.

The content of Ta can be 2.95%, 3%, 3.1%, 3.2%, 3.3%, 3.4%, 3.5%, 3.6%, 3.7%, 3.8%, 3.9%, 3.95% and so on.

The content of Al can be 2.5%, 2.6%, 2.7%, 2.8%, 2.9%, 3%, 3.1%, 3.2%, 3.3%, 3.4%, 3.5%, and so on.

The content of Ti can be 2.5%, 2.6%, 2.7%, 2.8%, 2.9%, 3%, 3.1%, 3.2%, 3.3%, 3.4%, 3.5%, and so on.

The content of W can be 2.1%, 2.2%, 2.3%, 2.4%, 2.5%, 2.6%, 2.7%, 2.8%, 2.9%, 3%, 3.1%, 3.2%, 3.3%, 3.4%, 3.5%, and so on.

The content of Mo can be 2.1%, 2.2%, 2.3%, 2.4%, 2.5%, 2.6%, 2.7%, 2.8%, 2.9%, 3%, 3.1%, 3.2%, 3.3%, 3.4%, 3.5%, and so on.

The content of Nb can be 1.65%, 1.7%, 1.75%, 1.8%, 1.85%, 1.9%, 1.95% and so on.

The content of Hf can be 0.2%, 0.3%, 0.4%, 0.5%, 0.6%, 0.7% and so on.

The content of C can be 0.03%, 0.04%, 0.05%, 0.06%, 0.07%, 0.08% and so on.

The content of B can be 0.01%, 0.02%, 0.03%, 0.04%, 0.05%, 0.06% and so on.

The content of Zr can be 0.03%, 0.04%, 0.05%, 0.06%, 0.07% and so on.

The content of each of the above elements is only an exemplary enumeration and is not limited thereto, and the rest of the dosages within the limitations can also be adopted.

In optional embodiments of the present disclosure, the sum of the mass percentage of Nb and W in the nickel-based superalloy can be 4.1%-5.1%.

For example, in various embodiments, the sum of the mass percentage of Nb and W in the nickel-based superalloy can be 4.1%, 4.2%, 4.3%, 4.4%, 4.5%, 4.6%, 4.7%, 4.8%, 4.9%, 5%, 5.1% and the like.

By optimizing the sum of the mass percentages of Nb and W within the above range, the W can be effectively dragged into the stacking faults while avoiding the precipitation of massive μ phase from the matrix, and then cooperate with the rest of the components to obtain stable Suzuki atmosphere being rich in Ta, Nb, W, and Ti in the superlattice stacking faults under high temperature.

In an optional embodiment of the present disclosure, the sum of the mass percentage of Ti, Nb and Ta in the nickel-based superalloy can be 7.8%-9.3%, preferably, 7.9%-9%.

For example, in various embodiments, the sum of the mass percentage of Ti, Nb and Ta in the nickel-based superalloy can be 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3% and the like.

By optimizing the sum of the mass percentages of Ti, Nb, and Ta within the above range, it is possible to avoid the precipitation of massive η phase from the matrix and at the same time ensure that the Al and Ti sublattices in the γ' phase can be replaced by Ta and Nb in a good ratio, which in turn can cooperate with the rest of the components to obtain stable Suzuki atmosphere being rich in Ta, Nb, W, and Ti in the superlattice stacking faults under high temperature.

In optional embodiments of the present disclosure, the mass percentage of Ti, Al, Nb and Ta in the nickel-based superalloy can satisfy: (Ti+Al)/(Nb+Ta)=1.1-1.3.

For example, in various embodiments, (Ti+Al)/(Nb+Ta) in the nickel-based superalloys can be 1.1, 1.12, 1.15, 1.18, 1.2, 1.22, 1.25, 1.28, 1.3 and the like.

The mass percentages of Ti, Al, Nb, and Ta are regulated within the above range, such that the Al and Ti sublattices in the γ' phase can be replaced by Ta and Nb in an optimal ratio to ensure the stability of the formed Suzuki atmosphere.

In optional embodiments of the present disclosure, the mass percentage of Cr, Co and Ni in the nickel-based superalloy can satisfy: Cr/(Co+Ni)=0.14-0.18.

For example, in various embodiments, Cr/(Co+Ni) in the nickel-based superalloy can be 0.14, 0.145, 0.15, 0.155, 0.16, 0.165, 0.17, 0.175, 0.18, and so on.

The mass percentages of Cr, Co and Ni are regulated within the above range, such that the Cr and Co bias-aggregate at the twinning.

In optional embodiments of the present disclosure, the nickel-based superalloy can further comprise Mg and/or Ce. Further, the content of Mg can satisfy: >0 and ≤0.01%; and the content of Ce can satisfy: >0 and ≤0.01%. For example, the content of Mg can be 0.0005%-0.01%. The content of Ce can be 0.0005%-0.01%.

In optional embodiments of the present disclosure, the nickel-based superalloy can comprise the following components in mass percentage:

Co 17%-22%, Cr 9%-13%, Ta 2.95%-3.95%, Al 2.5%-3.5%, Ti 2.5%-3.5%, W 2.1%-3.5%, Mo 2.1%-3.5%, Nb 1.65%-1.95%, Hf 0.2%-0.7%, C 0.03%-0.08%, B 0.01%-0.06%, Zr 0.03%-0.07%, Mg 0-0.01%, Ce 0-0.01% and Ni as the balance.

In optional embodiments of the present disclosure, the nickel-based superalloy can comprise the following components in mass percentage:

Co 18%-21%, Cr 9%-13%, Ta 2.95%-3.9%, Al 2.8%-3.5%, Ti 3.0%-3.5%, W 2.1%-3.5%, Mo 2.1%-3.5%, Nb 1.65%-1.85%, Hf 0.2%-0.5%, C 0.03%-0.08%, B 0.01%-0.06%, Zr 0.03%-0.07%, Mg 0-0.01%, Ce 0-0.01% and Ni as the balance.

In optional embodiments of the present disclosure, the nickel-based superalloys, during creep process at 780° C., include Suzuki atmosphere containing Cr and Co at microtwinning introduced by the creep deformation, and include Suzuki atmosphere containing Ta, Nb, W, and Ti at the superlattice stacking faults introduced by the creep deformation.

In an optional embodiment of the present disclosure, in the nickel-based superalloy, during creeping at 780° C., the deformation and the stacking fault of the structure mainly happen within the reinforcing phase.

The present disclosure also provides a preparation method for any of the above-described nickel-based superalloys, which can comprise the following steps:

preparing the bar stock by vacuum induction melting; then processing the bar stock by vacuum induction gas atomization to obtain an alloy powder; and preparing a billet by treating the alloy powder by hot isostatic pressing; and processing the billet by hot extrusion, forging and heat treatment.

In optional embodiments of the present disclosure, the condition of hot isostatic pressing treatment can comprise: the treatment temperature of hot isostatic pressing is 1120-1130° C., the pressure is 140-150 MPa, and the duration is 4-10 h.

In optional embodiments of the present disclosure, the temperature of hot extrusion can be 1120-1130° C., the extrusion ratio can be (5.5-6.5):1, and the extrusion rate can be 18-22 mm/s.

In an optional embodiment of the present disclosure, the forging can be isothermal forging, wherein the temperature of isothermal forging can be 1120-1130° C.; and the press-down rate can be 0.8-1.2 mm/s.

In practice, heat treatment includes solid solution heat treatment and aging heat treatment. Further, the solid solution heat treatment can comprise: treating at 1180° C. for 3 h, and then quenching in oil, wherein the temperature of oil is 150° C. The aging heat treatment can be treating at 760° C. for 16 h. Dual microstructure heat treatment adopts the conventional dual microstructure heat treatment operation, such that the grain size of the rim can reach grade 5-6, and the grain size of the hub can reach grade 10-12.

The present disclosure also provides structural component, which is primarily made of any of the above-described nickel-based superalloys.

In optional embodiments of the present disclosure, the structural component comprises a turbine disk.

The operating temperature of nickel-based superalloys of the present disclosure can up to 780-830° C., which meets the requirements of advanced aero-engines on materials.

Examples 1-10

Examples 1-10 respectively provide nickel-based superalloys 1#-10# and preparation methods therefor, the actually measured compositions of the nickel-based superalloys are shown in Table 1.

The preparation method of the nickel-based superalloy can include the following steps.

(1) Vacuum induction melting was adopted to prepare φ70 mm bar stocks; and vacuum induction gas atomization (VIGA) technique was adopted to prepare φ70 mm bar stock prepared by vacuum induction melting into superalloy powders.

(2) The powder lower than 53 μm was obtained by sieving, and loaded into stainless steel capsule; the capsule was degassed and sealed; and the sealed capsule was subjected to hot isostatic pressing (HIP), wherein the temperature thereof can be 1120° C., the pressure can be 140 MPa, and the duration was 4 h.

(3) The billet after hot isostatic pressing was subjected to hot extrusion by a heating furnace, wherein the temperature of hot extrusion can be 1120° C., the extrusion ratio can be 6:1, and the extrusion rate can be 20 mm/s.

(4) The hot extruded bar stock with length of 400 mm was isothermally forged into a billet disc of 600 mm. The forging temperature can be 1120° C. and the press-down rate can 1 mm/s.

(5) The billet disc was subjected to solid solution heat treatment, oil quenching and aging heat treatment, wherein the solid solution heat treatment was processed at 1180° C. for 3 h, followed by quenching with oil, wherein the temperature of oil was 150° C., and the aging heat treatment was processed at 760° C. for 16 h.

TABLE 1

Measured compositions (wt %) of nickel-based superalloys of different Examples

| No. | Co | Cr | Ta | Al | Ti | W | Mo | Nb | Hf | C | B | Zr | Mg | Ce | Ni |
|---|---|---|---|---|---|---|---|---|---|---|---|---|---|---|---|
| 1# | 17.8 | 11.9 | 3.7 | 3 | 3.2 | 3.1 | 2.9 | 1.76 | 0.34 | 0.0418 | 0.034 | 0.047 | 0.001 | 0.001 | balance |
| 2# | 18 | 12 | 3.9 | 3.3 | 3.1 | 3.2 | 3 | 1.83 | 0.36 | 0.0415 | 0.035 | 0.047 | 0.001 | 0.001 | balance |
| 3# | 19.5 | 11.9 | 3.3 | 3.2 | 3.2 | 2.8 | 3.3 | 1.69 | 0.31 | 0.0410 | 0.034 | 0.047 | 0.001 | 0.001 | balance |
| 4# | 18.5 | 11.8 | 3.9 | 3.5 | 3.5 | 3.3 | 3.2 | 1.95 | 0.33 | 0.0415 | 0.034 | 0.05 | 0.001 | 0.001 | balance |
| 5# | 18 | 11.9 | 3.6 | 2.5 | 2.5 | 2.5 | 3.3 | 1.95 | 0.33 | 0.0418 | 0.034 | 0.047 | 0.001 | 0.001 | balance |
| 6# | 20 | 10.5 | 3.9 | 3.1 | 3.3 | 2.1 | 3.5 | 1.65 | 0.36 | 0.0421 | 0.035 | 0.047 | 0.001 | 0.001 | balance |
| 7# | 20 | 10.5 | 2.95 | 2.5 | 2.8 | 3 | 2.5 | 1.75 | 0.31 | 0.0415 | 0.036 | 0.048 | 0.001 | 0.001 | balance |
| 8# | 20 | 12.5 | 2.95 | 3.1 | 3.3 | 3 | 3 | 1.65 | 0.35 | 0.0418 | 0.035 | 0.047 | 0.001 | 0.001 | balance |
| 9# | 18 | 13 | 3.5 | 3 | 3 | 3.1 | 3.5 | 1.75 | 0.36 | 0.0418 | 0.034 | 0.049 | 0.001 | 0.001 | balance |
| 10# | 18 | 12.5 | 3.5 | 3 | 3 | 3.5 | 2.5 | 1.95 | 0.33 | 0.0423 | 0.036 | 0.047 | 0.001 | 0.001 | balance |

Comparative Example 1-5

Comparative Example 1-5 respectively provide nickel-based superalloys Comparison 1#-Comparison 5#, of which the preparation method was the same as Example 1, and the difference was that the nickel-based superalloys had different compositions. The actually measured compositions of nickel-based superalloys of Comparative Examples 1-5 are shown in Table 2.

TABLE 2

Measured compositions (wt %) of nickel-based superalloys of different Comparative Examples

| No. | Co | Cr | Ta | Al | Ti | W | Mo | Nb | Hf | C | B | Zr | Mg | Ce | Ni |
|---|---|---|---|---|---|---|---|---|---|---|---|---|---|---|---|
| Comparison 1# | 16 | 14 | 3 | 3.1 | 3.3 | 3 | 1.9 | 1.5 | 0.35 | 0.0415 | 0.036 | 0.047 | 0.001 | 0.001 | balance |
| Comparison 2# | 16 | 14 | 4.5 | 3.1 | 3.3 | 3.3 | 2.1 | 2.2 | 0.36 | 0.0413 | 0.036 | 0.047 | 0.001 | 0.001 | balance |
| Comparison 3# | 23 | 12 | 2.5 | 3.1 | 3.2 | 1.5 | 3 | 1 | 0.35 | 0.0421 | 0.036 | 0.047 | 0.001 | 0.001 | balance |
| Comparison 4# | 23 | 12 | 4.5 | 3.1 | 3.2 | 4 | 4 | 2.8 | 0.35 | 0.0415 | 0.036 | 0.048 | 0.001 | 0.001 | balance |
| Comparison 5# | 20 | 12 | 3.8 | 3.5 | 3.8 | 1.2 | 3 | 2.5 | 0.35 | 0.0418 | 0.035 | 0.047 | 0.001 | 0.001 | balance |

Comparative Example 6-10

Comparative Examples 6-10 respectively correspond to existing alloys Rene95, EP741NP, Rene88DT, ME3 and ME501.

Experimental Example 1

Figure 2:
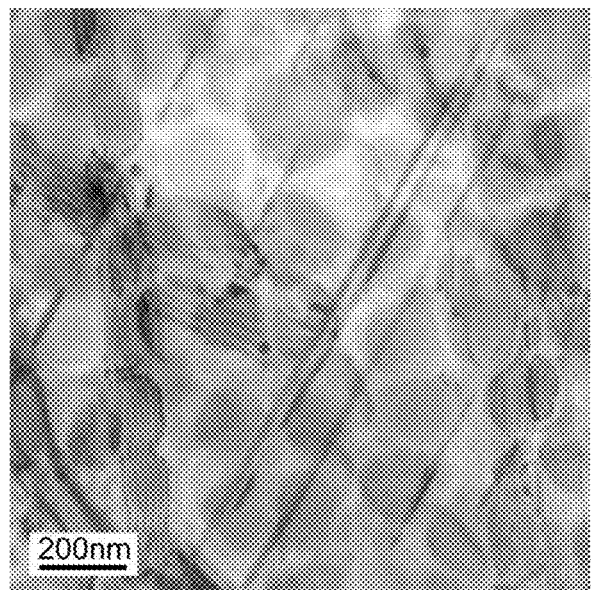
FIG. 2 is a photograph of the structure of the nickel-based superalloy comparison 1# after stress rupture provided in Comparative Example 1.

In order to comparatively illustrate the differences between the nickel-based superalloys of different Examples and Comparative Examples, the microstructures of the nickel-based superalloys of different Examples and Comparative Examples were characterized. FIG. 1 is a photograph of the structure of the nickel-based superalloy 1# provided in Example 1 of the present disclosure after stress rupture, and FIG. 2 is a photograph of the structure of the nickel-based superalloy comparison 1# provided in Comparative Example 1 of the present disclosure after stress rupture. Taking Embodiment 1 as an example to illustrate, the deformation and the stacking fault in the structure are predominantly within the reinforcing phase, while the deformation and stacking fault in Comparative Example 1 extend through the reinforcing phase and continue to expand.

Figure 3:
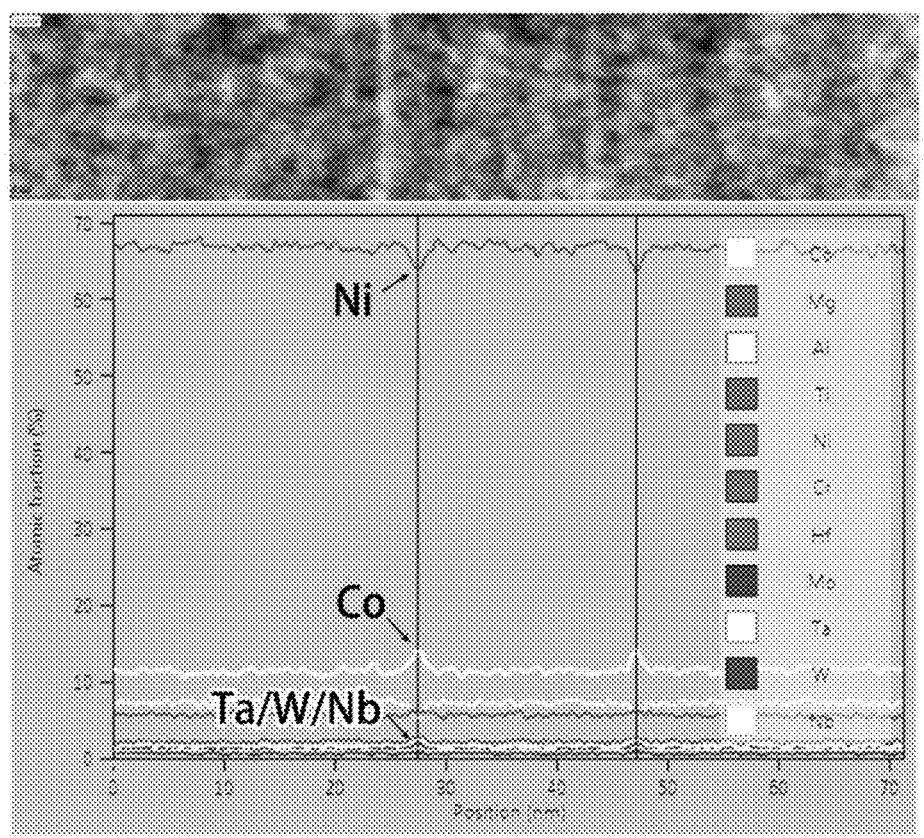
FIG. 3 is an image of deformed superlattice stacking faults after stress rupture and examination results of the chemical composition in the vicinity of the stacking faults of the nickel-based superalloy 1# provided in Example 1 of the present disclosure.
Figure 4:
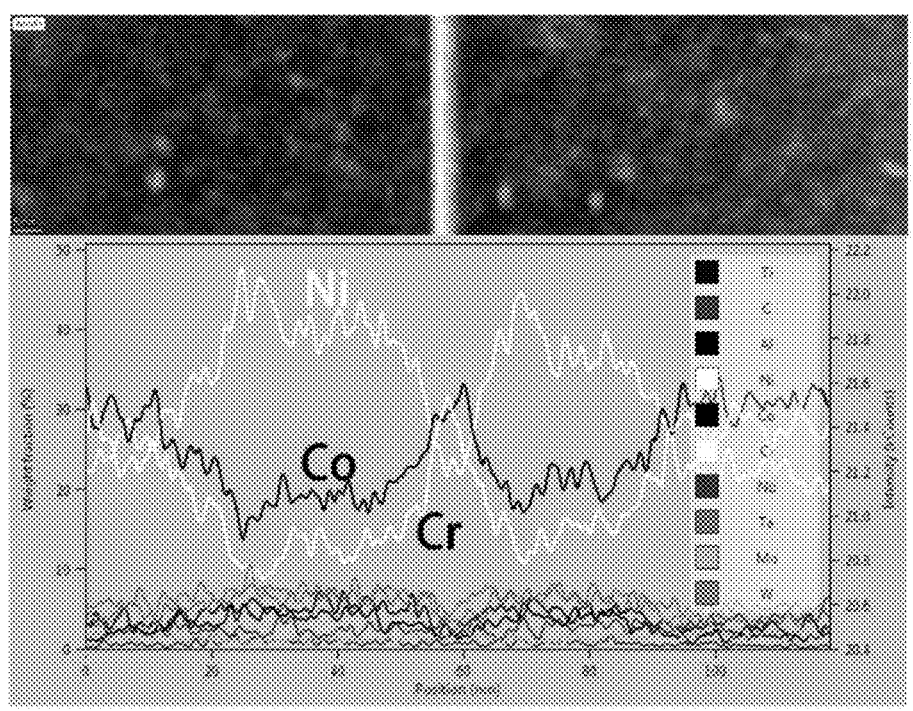
FIG. 4 is an image of deformed microtwinning after stress rupture and examination results of the chemical composition in the vicinity of the microtwinning of the nickel-based superalloy 1# provided in Example 1 of the present disclosure.
Figure 5:
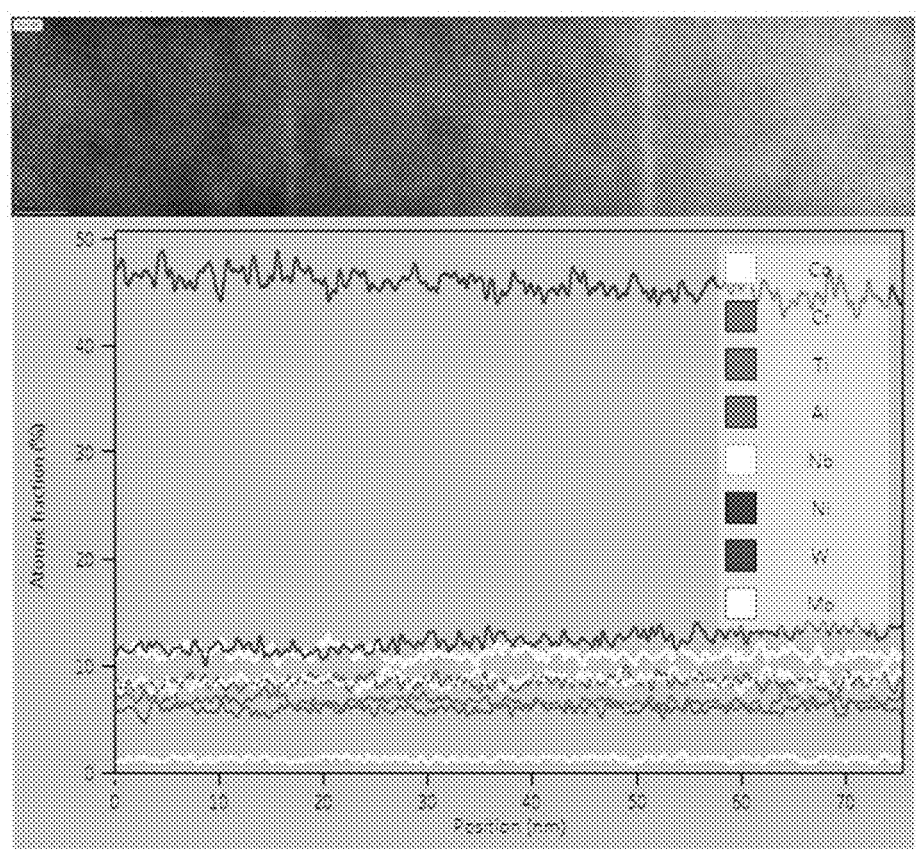
FIG. 5 is an image of deformed superlattice stacking faults after stress rupture and examination results of the chemical composition in the vicinity of the stacking faults of the nickel-based superalloy comparison 1# provided in Comparative Example 1 of the present disclosure.

FIG. 3 is an image of deformed superlattice stacking faults after stress rupture and examination results of the chemical composition in the vicinity of the stacking faults of the nickel-based superalloy 1# provided in Example 1 of the present disclosure; FIG. 4 is an image of deformed microtwinnings after stress rupture and examination results of the chemical composition in the vicinity of the microtwinnings of the nickel-based superalloy 1# provided in Example 1 of the present disclosure; and FIG. 5 is an image of deformed superlattice stacking faults after stress rupture and examination results of the chemical composition in the vicinity of the stacking faults of the nickel-based superalloy comparison 1# provided in Comparative Example 1. As can be seen from the figures, the nickel-based superalloy 1# provided in Example 1 of the present disclosure is rich in Co, Nb, Ta, W Suzuki segregation at superlattice stacking faults after stress rupture and has Suzuki atmospheres of Co, W, Ta, Nb; and is rich in Co and Cr Suzuki segregation at microtwinnings and has Suzuki atmospheres of Co and Cr. However, the nickel-based superalloy comparison 1# provided in Comparative Example 1 has no element segregation at the stacking fault after stress rupture. This Suzuki segregation effect of Examples of the present disclosure will drag dislocations and stacking faults, thereby making it difficult for deformation to continue, and increasing creep strength.

The chemical components near the deformation stacking faults of the nickel-based superalloys provided in the remaining Examples after stress rupture were detected, and the results are similar to those in Example 1. The chemical compositions near the deformation stacking faults of the nickel-based superalloys provided in the remaining Comparative Examples after stress rupture were detected, and no phenomenon such as element segregation at the stacking faults was found.

Experimental Example 2

The GB/T 2039-2012 standard was used to test the high-temperature durability of the 1#-10# nickel-based superalloys prepared in Examples 1-10 and the alloys in Comparative Examples 1-10. The test results are shown in Table 3.

TABLE 3

Durability test results of different superalloys

| No. | Load/ MPa | Temperature/ ° C. | Durability/ h |
|---|---|---|---|
| Example 1 | 630 | 780 | 1275 |
| Example 2 | 630 | 780 | 1103 |
| Example 3 | 630 | 780 | 1012 |
| Example 4 | 630 | 780 | 996 |
| Example 5 | 630 | 780 | 987 |
| Example 6 | 630 | 780 | 1004 |
| Example 7 | 630 | 780 | 994 |
| Example 8 | 630 | 780 | 1001 |
| Example 9 | 630 | 780 | 1010 |
| Example 10 | 630 | 780 | 996 |
| Comparative Example 1 | 630 | 780 | 653 |
| Comparative Example 2 | 630 | 780 | 749 |
| Comparative Example 3 | 630 | 780 | 498 |
| Comparative Example 4 | 630 | 780 | 731 |
| Comparative Example 5 | 630 | 780 | 657 |
| Comparative Example 6 (Rene95) | 630 | 780 | 31 |
| Comparative Example 7 (EP741NP) | 630 | 780 | 45 |
| Comparative Example 8 (Rene88DT) | 630 | 780 | 13 |
| Comparative Example 9 (ME3) | 630 | 780 | 29 |
| Comparative Example 10 (ME501) | 630 | 780 | 110 |

It can be seen from the above test results that the present disclosure can change the strengthening method of the alloy by regulating the content of Nb, W, Ti, Ta, Cr and Co within a certain range, which causes Suzuki atmosphere of specific elements to be generated at microtwinnings and superlattice stacking faults, so as to lock the dislocations, thereby improving the creep resistance and increasing the operating temperature of the alloy to above 780° C.

A final note should be made is that the above embodiments are used only to illustrate the technical solutions of the present disclosure and are not intended to be a limitation thereof. Although the present disclosure is described in detail with reference to the foregoing embodiments, those of ordinary skill in the art should understand that the technical solutions recorded in the preceding embodiments can still be modified, or some or all of the technical features therein can be replaced with equivalent replacements, and these modifications or replacements do not take the essence of the corresponding technical solutions out of the scope of the technical solutions of the embodiments of the present disclosure.

INDUSTRIAL APPLICABILITY

Embodiments of the present disclosure provide a nickel-based superalloy and a preparation method therefor, and a structural component, wherein the nickel-based superalloy of the present disclosure utilizes Nb, W, Ti, and Ta to synergistically strengthen the γ' phase to generate element-specific Suzuki atmosphere at microtwinnings and superlattice stacking faults, so as to lock dislocations to improve creep resistance; and the operating temperature of nickel-based superalloy of the present disclosure can be raised to 780-830° C., which meets the requirements on the materials for advanced aero-engines.

Furthermore, it can be appreciated that the nickel-based superalloys, the preparation method thereof, and the structural components provided by embodiments of the present disclosure are reproducible and can be used in a variety of industrial applications. For example, the nickel-based superalloys provided in embodiments of the present disclosure and the preparation method therefor and structural components thereof can be used in technical fields involving nickel-based superalloys.

What is claimed is:

1. A nickel-based superalloy, wherein the nickel-based superalloy comprises following components in mass percentage:

Co 17%-22%, Cr 9%-13%, Ta 2.95%-3.95%, Al 2.5%-3.5%, Ti 2.5%-3.5%, W 2.1%-3.5%, Mo 2.1%-3.5%, Nb 1.65%-1.95%, Hf 0.2%-0.7%, C 0.03%-0.08%, B 0.01%-0.06%, Zr 0.03%-0.07% and a balance of Ni; and a sum of mass percentages of Nb and W is 3.75%-5.25%, wherein in the nickel-based superalloy, mass percentages of Cr, Co and Ni satisfy: Cr/(Co+Ni)=0.14-0.18, and wherein the nickel-based superalloy, during a creep process at 780° C., has a Suzuki atmosphere containing Cr and Co at microtwinnings introduced by a creep deformation, and has a Suzuki atmosphere containing Ta, Nb, W, and Ti at superlattice stacking faults introduced by the creep deformation.

2. The nickel-based superalloy according to claim 1, wherein, in the nickel-based superalloy, the sum of the mass percentages of Nb and W is 4.1%-5.1%.

3. The nickel-based superalloy according to claim 1, wherein, in the nickel-based superalloy, a sum of mass percentages of Ti, Nb and Ta is 7.8%-9.3%.

4. The nickel-based superalloy according to claim 1, wherein, in the nickel-based superalloy, mass percentages of Ti, Al, Nb and Ta satisfy: (Ti+Al)/(Nb+Ta)=1.1-1.3.

5. The nickel-based superalloy according to claim 1, wherein the nickel-based superalloy further comprises Mg and/or Ce; and a content of Mg satisfies: >0 and ≤0.01%; and a content of Ce satisfies: >0 and ≤0.01%.

6. A preparation method for preparing the nickel-based superalloy according to claim 1, wherein the preparation method comprises following steps:

preparing a bar stock by a vacuum induction melting;

then processing the bar stock by a vacuum induction gas atomization to obtain an alloy powder;

preparing a billet by performing a hot isostatic pressing treatment on the alloy powder; and processing the billet by a hot extrusion, a forging and a heat treatment.

7. A structural component, wherein the structural component is primarily made from the nickel-based superalloy according to claim 1.

8. The structural component according to claim 7, wherein the structural component comprises a turbine disk.

* * * * *